June 2, 1964  N. A. WRIGGLESWORTH ETAL  3,135,817
MICROSCOPE FOCUS ADJUSTMENT MEANS UTILIZING COMPOUND CAM
Filed June 23, 1960  4 Sheets-Sheet 1
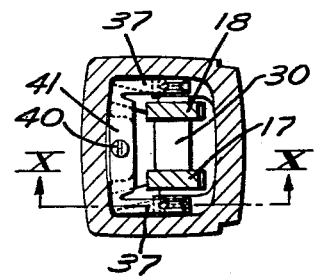
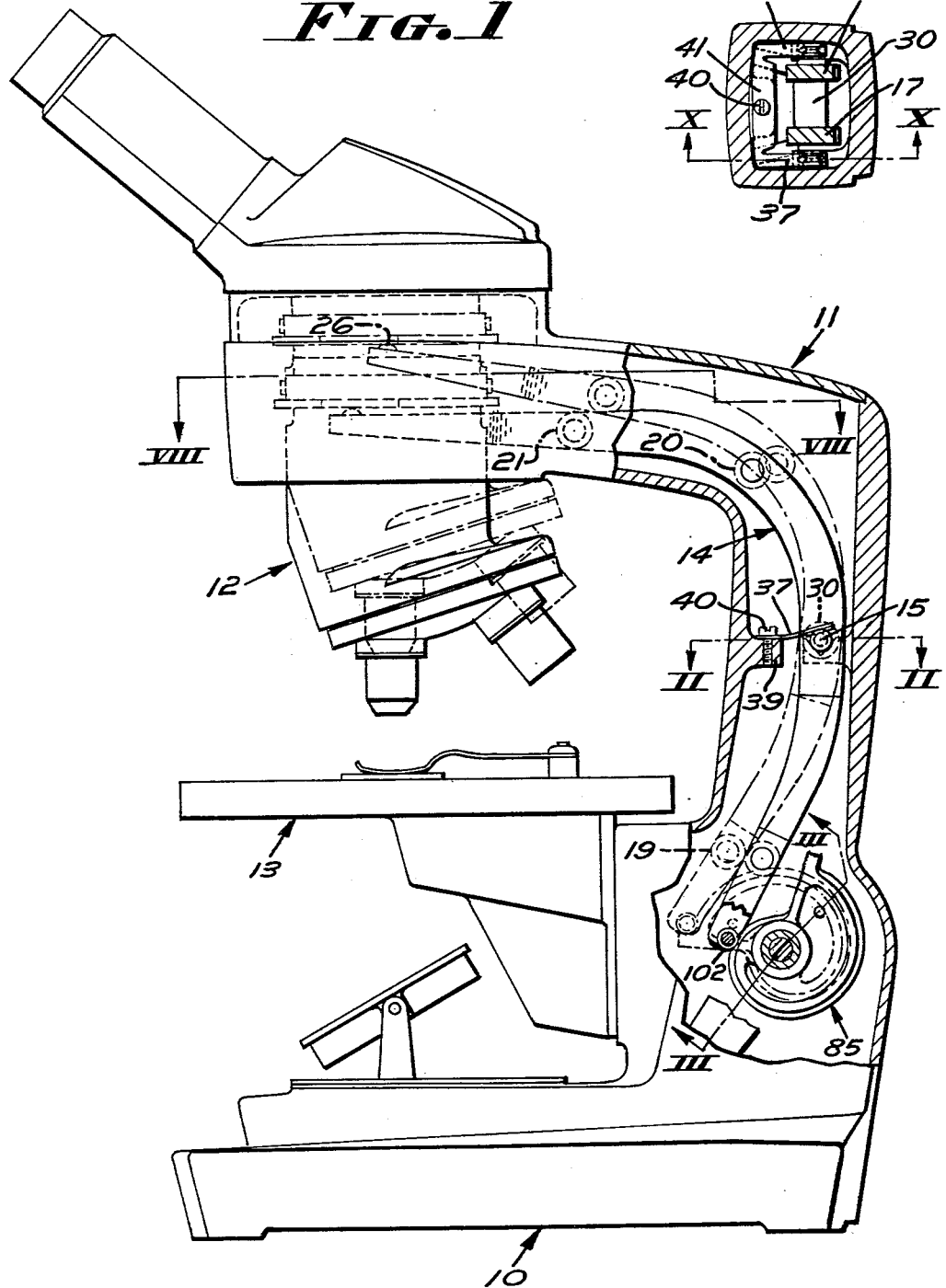

June 2, 1964   N. A. WRIGGLESWORTH ETAL   3,135,817
MICROSCOPE FOCUS ADJUSTMENT MEANS UTILIZING COMPOUND CAM
Filed June 23, 1960                        4 Sheets-Sheet 2
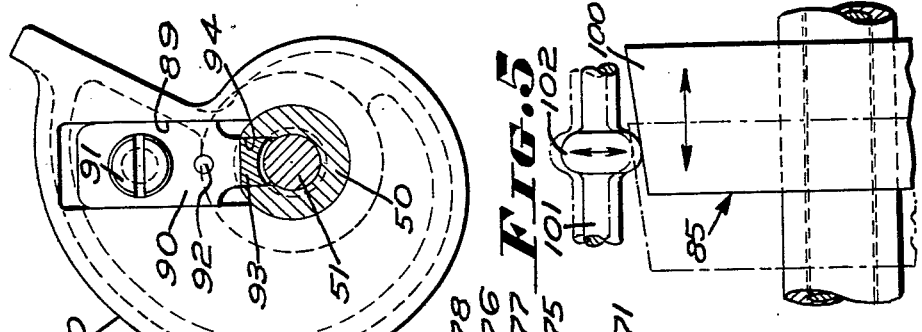
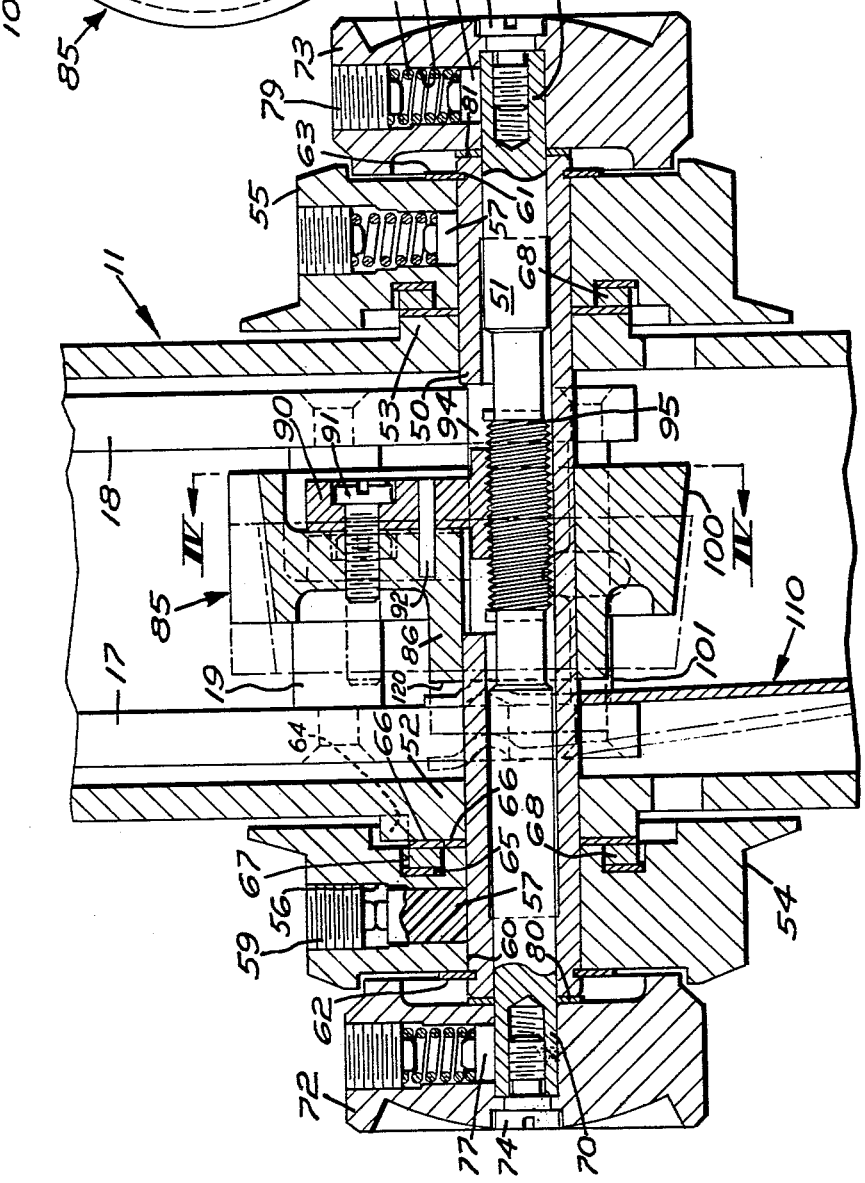

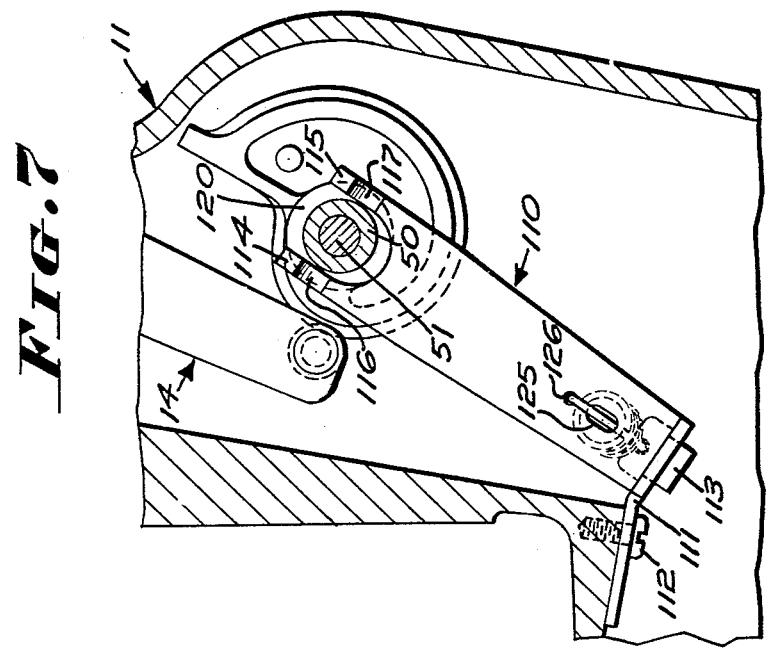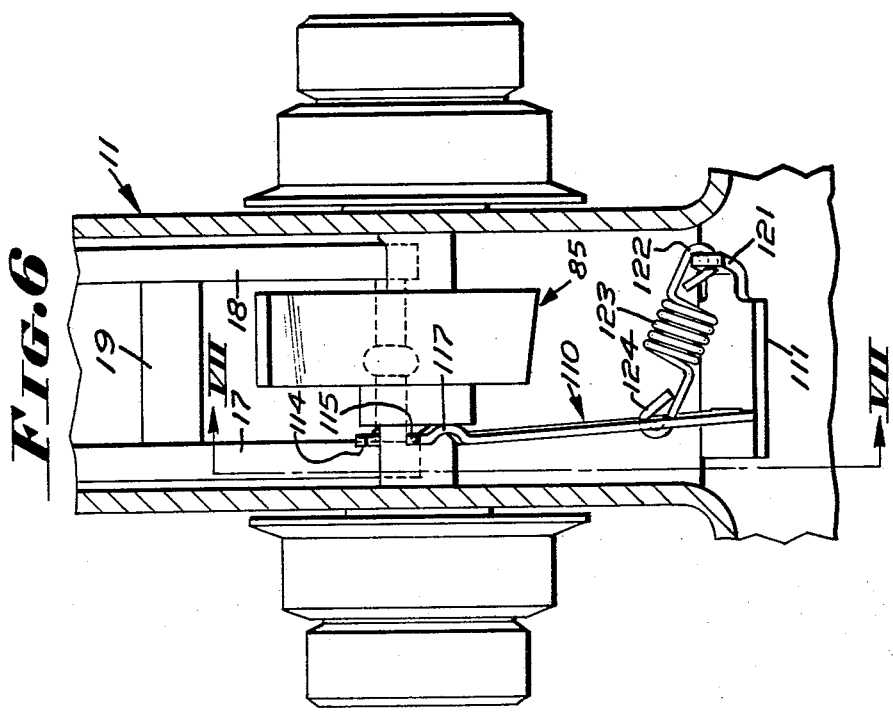

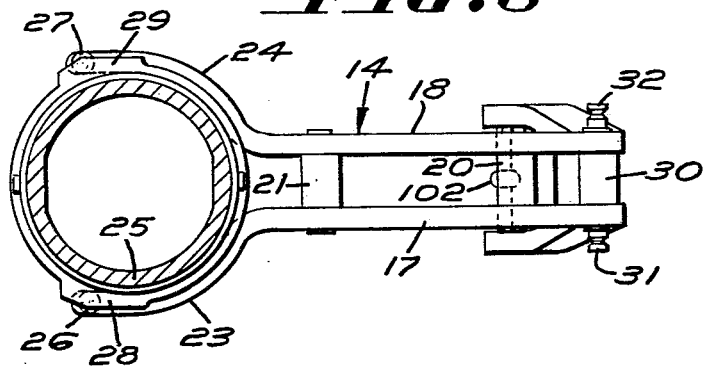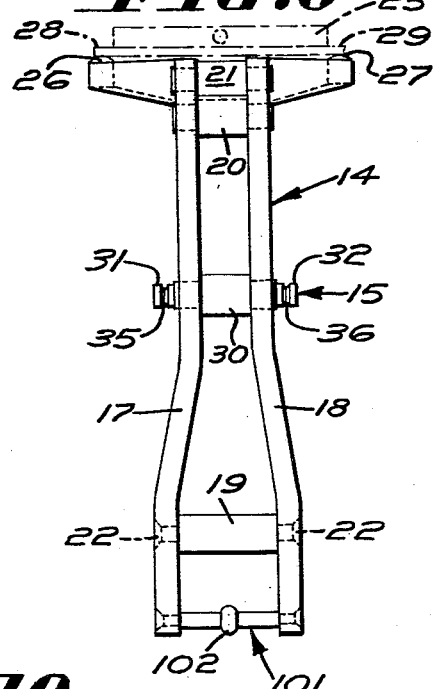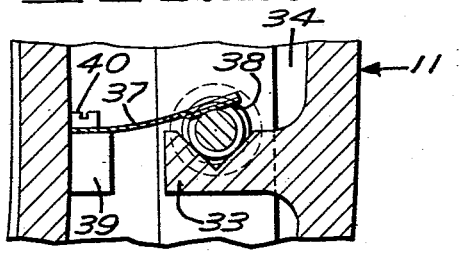

United States Patent Office 3,135,817
Patented June 2, 1964

3,135,817
MICROSCOPE FOCUS ADJUSTMENT MEANS UTILIZING COMPOUND CAM
Norman A. Wrigglesworth and Leopold R. Jasienski, Buffalo, N.Y., assignors to American Optical Company, Southbridge, Mass.
Filed June 23, 1960, Ser. No. 38,185
6 Claims. (Cl. 88—39)

This invention relates in general to mechanical movements, and pertains more particularly to a combined coarse and fine adjustment mechanism particularly adapted for use in conjunction with the focusing mechanisms of microscopes.

A primary object of the present invention is to provide a compound adjustment mechanism, particularly adapted for obtaining coarse and fine adjustments by use of separate adjusting knobs which are so oriented that the user of a microscope may easily move his fingers from the coarse adjustment knob to the fine adjustment knob without having to take his eye away from the eyepiece.

More specifically, the invention contemplates the use of a single cam element for effecting both a coarse and fine adjustment whereby corresponding adjustment knobs may operate through concentrically disposed members for obtaining the overall adjustment effect.

Still more specifically, the present invention includes provision of a compound cam member, having a cam surface adapted for effecting coarse adjustment in response to rotary motion to the cam; said cam surface being tapered transversely thereof so as to provide additional adjustment responsive to lineal movement of the cam along its axis of rotation. In this fashion, a pair of concentrically disposed actuating members with axially aligned control knobs may be utilized for effecting the requisite control motions of the cam member to effect the individual adjustments desired.

In order to effect the above described compound movements to the cam member, the same is provided with an element acting both as a key and a nut, which element projects through an axially extending slot in a hollow tubular shaft to engage a secondary shaft having external screw threads with which the combined key and nut member is engaged. Therefore, upon rotation of the outer shaft, rotary motion will be imparted to the cam; whereas upon rotation of the inner shaft, axial motion will be imparted to the cam, thus effecting the corresponding coarse and fine adjustments as desired.

In the accompanying drawing:

FIG. 1 is a side elevational view, partly broken away, illustrating a microscope utilizing an adjustment mechanism in accordance with this invention;

FIG. 2 is a horizontal section taken substantially along the plane of section line II—II of FIG. 1, illustrating the trunnion mounting for the operating lever;

FIG. 3 is an enlarged vertical section taken substantially along the plane of section line III—III of FIG. 1 and illustrating the compound adjustment mechanism;

FIG. 4 is a side elevational view of the cam member taken along the plane of section line IV—IV of FIG. 3;

FIG. 5 is a diagrammatic view illustrating how axial movement of the cam will effect adjustment of the microscope focusing lever;

FIG. 6 is an enlarged sectional view taken in the region of the adjusting cam mechanism;

FIG. 7 is a vertical section taken substantially along the plane of section line VII—VII in FIG. 6, and illustrating the backlash pickup mechanisms associated with the axial adjustment for the cam;

FIG. 8 is a horizontal section taken substantially along the plane of section line VIII—VIII in FIG. 1 and illustrating the manner of connection between the focus control lever and the nose piece of the microscope;

FIG. 9 is a rear elevational view of the assembly shown in FIG. 8; and

FIG. 10 is an enlarged vertical section taken substantially along the plane of section line X—X in FIG. 2, and further illustrating the trunnion mounting for the lever.

Referring now to FIG. 1, a generally conventional microscope is illustrated therein to include a base portion 10; a support arm as indicated generally by the reference character 11; and a nose piece as indicated generally by the reference character 12. As is well known, it is desirable to be able to accurately adjust the elevation of the nose piece 12 with respect to the stage which is generally indicated by the reference character 13; and it is to this end that the present invention is specifically directed, although it is to be understood that the adjustment principles of the present invention may be employed in other and different combinations as desired.

As shown herein, adjustments of the nose piece are effected by means of a lever which is indicated generally by the reference character 14; said lever being pivotally mounted within the support arm 11 by means of a trunnion shaft 15, so that the lever may be rocked as is illustrated between the full and dotted line positions thereof shown in FIG. 1. The lever 14 is more clearly shown in FIGS. 8 and 9 wherein it will be seen that the lever comprises a pair of lever arms 17 and 18 disposed in spaced-apart relationship and rigidly interconnected by spacer elements 19, 20, 21 which are constructed to include reduced end portions received in apertures in the lever arms 17 and 18 subsequent to assembly the reduced end portions are upset as indicated by the reference character 22 in FIG. 9 to secure rigid interconnections between the spacers and the arms 17 and 18. It is to be understood that any other suitable means may be utilized for effecting rigid interconnections between the spacers and the arms so that the lever arms are joined together to provide a rigid and integral assemblage.

The upper extremities 23 and 24 of the lever arms are divergent to straddle the barrel portion 25 of the nose piece 12, and the terminal ends of these portions 23 and 24 are provided with upraised bearing portions 26 and 27 (FIGS. 8, 9) upon which flange portions 28 and 29 of the nose piece rest. Thus, as the lever 14 is rocked about the axis of the trunnion shaft 15, the nose piece will be raised and lowered in accordance therewith. The trunnions for the lever 14 may be provided by forming reduced end portions on a spacer 30; but in any event two trunnion portions as indicated at 31 and 32 project laterally from opposite sides of the lever, substantially as is shown in FIGS. 8, 9.

As can be seen in FIG. 10, these trunnion portions 31 and 32 are disposed to rest in a pair of spaced apart V-shaped bearings or supports 33 rigid with the neck 11 and disposed to project into the hollow interior 34 thereof within which the lever 14 is disposed. The trunnions 31, 32 are grooved as indicated at 35, 36 to rest on corresponding knife-edge portions of the bearings 33—33. A C-shaped spring device having opposite spring leg portions 37 (FIGS. 1, 2, 10) are arranged to bear down upon the trunnions and keep them within the bearings 33. Preferably the spring legs are provided with tongues 38, as indicated at FIG. 10 to be received in the respective grooves 35 and 36 of the trunnions so as to laterally position the lever 14 and prevent tipping thereof from side to side within the support arm. As shown, the spring device is mounted in cantilever fashion from mounting block portions 39 formed integral with the arm 11, as by means of suitable fastener members 40. The spring strip 37 may be separate pieces, or, as is shown more fully in FIG. 2, they may be projections from a common strip having its intermediate portion 41 seated upon the mounting block 39 and secured thereto by the aforementioned fastener 40.

Referring now primarily to FIG. 3, the ajustment mechanism is shown to include a hollow, outer, quill shaft 50 and an inner shaft 51 disposed concentrically with respect to each other substantially as is shown. The quill shaft 50 is journalled in bearing box portions 52, 53 located in opposite sides of the support arm 11 and this shaft projects laterally outwardly from the support at opposite sides thereof, each end mounting a hand knob such as those indicated by reference characters 54 and 55. The hand knobs are rotatably fitted upon the outer shaft 50 and each is provided with a radial bore 56 mounting a clutch pad 57, and a threaded plug element 59. The bore in handle 55 carries a short pad 57 and a compression spring 58. With the parts assembled as shown, the friction pad 57 is spring urged into engagement with the outer surface of the shaft 50 so as to cause rotation of the shaft normally in unison with the hand knob 55, so that in effect, the two are clutched together by the pad 57. However, should the operator overrun the total adjustment range of the mechanism, the friction pad 57 will permit relative rotation between the hand knob 55 and the shaft 50.

In the knob 54 the clutch pad 57 is high enough so the plug 59 may be threaded down directly thereagainst to lock the pad to the shaft 50. A stop lug 64 extends from the arm 11 and a projecting stop (not shown) is provided on the adjacent inner periphery of knob 54. Thus an indexed coarse setting adjustment may be made when the instrument is to be used continually or over and over under conditions requiring the same coarse setting by first obtaining the desired coarse setting, turning the knob 54 with its projecting stop against the stop lug 64 and then locking the knob to shaft 50 by tightening down on the plug 59. Then at any time, the operator may quickly return to the desired coarse setting by turning the knob 54 until the respective stops are in engagement.

The opposite ends of the shaft 50 are provided with circumferentially extending grooves 60 and 61 receiving the circulate members 62 and 63 which locate the hand knobs 54 and 55. Thrust washers 65 and 66 are associated with the hand knobs, the thrust washer 65 being disposed within a recess 67 in the innerside of each of the respective hand knobs and the thrust washer 66 being seated against the outer face of the bosses 52 and 53. Interposed between these two thrust washers is a friction ring element 68. Normally, the dimensions of the various parts is such as to preload the friction rings 68 so as to establish drag, resisting rotation of the hand knobs 54, 55 and consequently of outer shaft 50. The purpose of this construction will be presently apparent.

The inner shaft 51 is longer than the outer shaft 50 and the opposite ends thereof project beyond the respective ends of the outer shaft. These projecting end portions 70 and 71 of the inner shaft have hand knob members 72 and 73 mounted thereon. Cap screws 74 and 75 threaded axially into the opposite ends 70, 71 of the inner shaft serve to axially position the hand knobs 72 and 73 and these hand knobs, similar to the hand knob 55 are not directly connected to their corresponding shaft 51. Rather, each is provided with radial bore such as indicated at the reference character 76 housing the friction pad 77, the compression spring 78 and the plug element 79, substantially as shown, so that the two knobs 72 and 73, like the knob 55, are actually connected to their associated shaft by an overload release clutch mechanism.

Interposed between the ends of the outer shaft 50 and the opposing faces of the hand knobs 72 and 73 are thrust washers or bearing members 80 and 81, the purpose being to minimize the tendency of rotation of the hand knobs 72 and 73 to impart rotary motion to the shaft 50. The friction ring 68, referred to hereinabove, also serves to eliminate rotary motion of quill shaft 50 being caused by rotation of hand knobs 72, 73.

A cam element indicated generally by the reference character 85 is slidably mounted on the quill shaft 50, the hub portion 86 of such cam element being provided with an axial bore 87 for this purpose. One side face of the cam element 85 is provided with a groove 89 (FIG. 4) which receives a combined key and nut element 90 secured to the cam element by suitable fastener 91 and also preferably pinned thereto as by a pin 92 to assure that no relative motion is permitted between the member 90 and the cam element 85. The lower end 93 of this element 90 is provided with straight, flat opposite sides snugly but slidably received within an axially extending groove or keyway 94 in the quill shaft 50. The inner shaft 51, within and beyond the confines of the keyway 94, is provided with external threads 95 and the lower end face portion 93 of the element 90 is formed on an arc corresponding to the periphery of the inner shaft 51 and has partial threads formed thereon so that in effect member 90 acts as a nut relative to the threaded portion 95 of the inner shaft 51.

As can be seen in FIG. 4, the outer peripheral surface of the cam element 85 is of constantly changing radius of curvature so that as rotary motion is imparted to this cam element, a camming action will be achieved. FIG. 3 illustrates that this same peripheral surface 100 is tapered from side to side of the cam element or in a direction axially of the shafts 50 and 51. Consequently, as the cam element 85 is rotated, a coarse adjustment will be effected by the cam action produced on an element bearing thereagainst and upon axial movement of the cam element, a much finer camming adjustment of the same element will be effected due to the taper on the peripheral surface 100 of the cam.

Referring again to FIG. 9, it will be seen that the lower extremity of lever 14 carries a cam follower indicated generally by the reference character 101 and which is rigidly affixed between the legs 17 and 18 and is provided intermediately thereof with an enlarged cam follower bead 102 which is curved as shown so as to establish substantial contact between the bead 102 and the outer peripheral surface 100 of the cam element 85. It will be appreciated, from FIG. 1, that the weight of the nose piece 12 will normally tend to rotate the lever 14 about the axis of the trunnion 15 to engage the cam follower bead 102 against the peripheral outer surface 100 of the cam 85. As soon as the rotary motion is imparted to the cam 85, the lever 14 will be moved from the solid line position shown in FIG. 1 to a new position causing the corresponding vertical movement of the nose piece 12. This is the coarse adjustment and is effected by turning either one or both of the knobs 54 and 55, which correspondingly rotate the outer shaft 50, and at this point, it will be understood there is sufficient friction between the two shafts 50 and 51 due not only to the fact that the inner shaft 51 is journalled within the outer shaft 50 but also due to the fact that there is some preloading between the individual cam knobs 72 and 73, through the thrust washer 81 and the opposite ends of the outer shaft 50. In any event, it is desirable that rotary motion imparted to the shaft 50 by the hand knob 54, 55 causes rotation of inner shaft in unison therewith and obviates any relative motion therebetween.

Once the coarse adjustment has been made, the end knob 72 or 73 or both are rotated to turn the inner shaft 51, while as previously set forth, the outer shaft remains stationary. Thus, the rotation of the inner shaft 51 causes a corresponding axial movement of the cam member, that is from left to right, or vice versa in FIG. 3, to change the point of contact between the cam follower head 102 and the tapered outer surface 100 of the cam element 85. This effects the fine adjustment and it is illustrated diagrammatically in FIG. 5 wherein the full and dotted line positions of both the cam element 85 and the cam follower head 102 illustrate that movement of the cam from right to left in FIG. 5 will cause movement of the cam follower bead 102 and consequently of the lever 14 as shown.

In order to take up any backlash in the fine adjustment, a pre-load take-up lever 110 (see particularly FIGS. 6 and 7) is utilized. A mounting strip 111, secured to the support arm 11 by a suitable fastener 112 or preferably a plurality of such fasteners, serves as a mounting base for the pre-load take-up lever 110. The strip 111 is provided with a slot receiving a reduced tongue portion 113 at the lower extremity of the take-up lever 110 with there being sufficient clearance between the tongue and the slot to permit pinning of the lever 110 relative to the member 111. The upper extremity of the lever 110 is provided with a pair of bifurcated finger portions 114, 115 formed as shown to provide the arcuate bearing nose portions 116 and 117 which bear against the outer face 120 of the plug 86 of the cam element. The member 111 is provided with an up struck finger portion 121 provided with a suitable aperture receiving the hook end portion 122 of a tension spring 123, the opposite end of which is hooked by 124 to a pair of suitable apertures 125 and 126 in the strip or lever 110. Thus, the spring 123 exerts a constant pre-load on the cam element 85 in a direction tending to move the same to the right in FIG. 6, thus serving to take up any backlash between the threads of the element 90 and the inner shaft 51.

From the drawings and foregoing description it will be apparent that the adjustment means of the invention constitutes a great improvement in the art by providing a very compact mechanism for effecting both coarse and fine adjustments which is very easy and convenient to manipulate. The user of a microscope equipped with the adjustment means of the invention may easily switch from the coarse to the fine adjustment controls or vice versa by sliding his fingers from one to the other with his eyes continually at the eyepiece of the microscope, and it will be understood that, while only one form of the invention has been shown and described certain changes and modifications may be made therein without departing from the spirit of the invention or the scope of the claims.

We claim:

1. In combination with a microscope having a base, a support arm extending upwardly from the base, a lens carrying member slidably mounted on said arm at the upper end thereof, compound cam means mounted adjacent said base including a single cam member having a compound cam surface providing two different camming motions, means for selectively moving said cam member in either one of two directions to selectively use one of its camming motions, and linkage means extending from adjacent said base to the upper end of said arm interconnecting said cam means and said lens carrying member for moving the latter in response to operation of said cam means.

2. In combination with a microscope having a base, a support arm extending upwardly from the base, a focusing member slidably mounted on the arm, a lever within said arm pivotally mounted intermediate its ends with its upper end engaging the focusing member for moving the same in response to pivoting of the lever; a pair of concentrically disposed shafts rotatably mounted in said arm adjacent said base, a cam member carried by the outer of said shafts and being slidable relative thereto, said cam member having an outer surface of varying radius of curvature and tapering from side to side thereof axially of said outer shaft, the inner of said shafts having a threaded portion, and nut means carried by said cam member engaging said threaded portion to effect axial movement of said cam member as said inner shaft is rotated relative to said outer shaft, means frictionally engaging said outer shaft with said arm, means frictionally engaging said inner shaft with said outer shaft, with the drag produced by the first of such friction means being greater than the drag produced by the second of such means, whereby while rotation of the outer shaft will effect corresponding rotation of the inner shaft, rotation of the inner shaft is ineffective to rotate the outer shaft.

3. In combination with a microscope having a base, a support arm extending upwardly from the base, a focusing member vertically slidably mounted on the arm, a lever within the neck pivotally mounted intermediate its ends with its upper end engaging the nosepiece for vertically moving the same in response to pivoting of the lever; a pair of concentrically disposed shafts rotatably mounted in said arm adjacent said base, a cam member carried by the outer of said shafts and being slidable relative thereto, said cam member having an outer surface of varying radius of curvature and tapering from side to side thereof axially of said outer shaft, the inner of said shafts having a threaded portion, and nut means carried by said cam member engaging said threaded portion to effect axial movement of said cam member as said inner shaft is rotated relative to said outer shaft, means frictionally engaging said outer shaft with said arm, means frictionally engaging said inner shaft with said outer shaft, with the drag produced by the first of such friction means being greater than the drag produced by the second of such means, whereby while rotation of the outer shaft will effect corresponding rotation of the inner shaft, rotation of the inner shaft is ineffective to rotate the outer shaft, said outer shaft having a longitudinal keyway therein exposing said threaded portion of the inner shaft, said nut means projecting through said keyway and serving to fix said cam member against rotation relative to said outer shaft.

4. A microscope comprising a base, a hollow arm extending upwardly from said base, a stage adjacent the lower end of said arm, and optical means freely slidably carried by the upper end of said arm for up and down movement to focus upon an object on said stage; lever means pivotally carried within said arm and including a support portion upon which said optical means rests and is supported, and compound cam means engaging said lever means to raise and lower said support portion thereof to effect coarse and fine adjustment of said optical means.

5. In a microscope having a base, a support arm assembly rising from said base and a member slidably mounted on said arm assembly, and a common assembly for effecting both coarse and fine focusing adjustment movements of said member, said common assembly comprising a lever pivotally mounted on said arm assembly and having a portion forming a support for said member and upon which the latter rests, a cam for rocking said lever, means carried by said arm assembly mounting said cam for rotary motion about a predetermined axis and for axial movement therealong, said cam having a compound cam surface tapering both circumferentially and laterally, and means for selectively imparting either one of the aforesaid motions to said cam.

6. In a microscope having a base, a support fixed to said base and including a vertical portion defining an upright and a generally horizontal portion defining an arm extending laterally from said upright, an objective assembly including a body slidably engaged with the free end of said arm and depending therefrom, and means for moving said objective assembly vertically relative to said arm, said upright and said arm being hollow with the body of said objective assembly projecting partially into said arm, said means comprising a lever pivoted intermediate its ends to said support and extending upwardly within said upright, laterally within said arm and having a free end portion straddling that portion of said objective body which extends into said arm, said portion of the objective body which extends into said arm having support surfaces resting upon the free end portion of said lever, said means also including a cam for imparting pivotal motion to said lever for moving said objective assembly as aforesaid, said cam having a compound cam surface providing two different camming motions, and means for selectively moving said cam in either one of two directions to selectively render one of its camming motions effective upon said lever.

References Cited in the file of this patent

UNITED STATES PATENTS

| | | |
|---|---|---|
| 1,984,127 | Gallasch | Dec. 11, 1934 |
| 2,249,656 | Huband | July 15, 1941 |
| 2,311,769 | Mitchel | Feb. 23, 1943 |
| 2,456,317 | Rabinow | Dec. 14, 1948 |
| 2,563,789 | Kurtz et al. | Aug. 7, 1951 |
| 2,789,461 | Leitz et al. | Apr. 23, 1957 |
| 2,902,764 | Metallo | Sept. 8, 1959 |
| 3,019,707 | Straat | Feb. 6, 1962 |

FOREIGN PATENTS

| | | |
|---|---|---|
| 231,285 | Switzerland | June 1, 1944 |
| 1,163,194 | France | Apr. 21, 1958 |